United States Patent
Alm et al.

(10) Patent No.: US 10,483,744 B2
(45) Date of Patent: Nov. 19, 2019

(54) BEND LIMITING DEVICE FOR A CABLE CONNECTED TO A FLOATING MARINE INSTALLATION OR VESSEL

(71) Applicants: W4P Waves4Power AB, Västra Frölunda (SE); NKT Cables AB, Falun (SE)

(72) Inventors: Filip Alm, Bohus (SE); Lars Efraimsson, Fagerfjäll (SE)

(73) Assignees: W4P WAVES4POWER AB, Vastra Frolunda (SE); NKT CABLES AB, Falun (SE)

( * ) Notice: Subject to any disclaimer, the term of this patent is extended or adjusted under 35 U.S.C. 154(b) by 0 days.

(21) Appl. No.: 15/780,387

(22) PCT Filed: Nov. 8, 2016

(86) PCT No.: PCT/SE2016/000065
§ 371 (c)(1),
(2) Date: May 31, 2018

(87) PCT Pub. No.: WO2017/095286
PCT Pub. Date: Jun. 8, 2017

(65) Prior Publication Data
US 2018/0375318 A1    Dec. 27, 2018

(30) Foreign Application Priority Data
Dec. 1, 2015   (SE) ...................... 1530182

(51) Int. Cl.
*F16M 13/02*   (2006.01)
*H02G 9/12*    (2006.01)
*H02G 3/04*    (2006.01)

(52) U.S. Cl.
CPC .............. *H02G 9/12* (2013.01); *F16M 13/02* (2013.01); *H02G 3/0462* (2013.01)

(58) Field of Classification Search
CPC combination set(s) only.
See application file for complete search history.

(56) References Cited

U.S. PATENT DOCUMENTS 6,220,303 B1 *  4/2001  Secher ................. E21B 17/017
                                                            138/110
6,848,862 B1 *  2/2005  Schlig .................... B63B 22/18
                                                            116/107

(Continued)

FOREIGN PATENT DOCUMENTS

WO   WO 2010030160   3/2010

OTHER PUBLICATIONS

International Search Report, PCT/SE2016/000065, dated Feb. 23, 2017.
Written Opinion, PCT/SE2016/000065, dated Feb. 23, 2017.

*Primary Examiner* — Monica E Millner
(74) *Attorney, Agent, or Firm* — Young & Thompson

(57) ABSTRACT

A bend limiting device for a cable includes at least one elongated sleeve member with an entrance end exhibiting an entrance opening and an opposite exit end exhibiting an exit opening for the cable, an outer abutment surface between the entrance and exit ends secures against a rigid surface of a floating marine installation or vessel, an axially through-going hole between the entrance opening and the exit opening accommodates a portion of the cable, and at least one clamping device secures the sleeve member in a fixed position around the cable portion. The outer abutment surface of the sleeve member allows it to be secured against the rigid surface by applying a pulling force on the cable in a direction from the abutment surface to the rigid surface, as well as to be detached from the rigid surface when the application of pulling force on the cable ceases.

20 Claims, 3 Drawing Sheets

(56) References Cited

U.S. PATENT DOCUMENTS

| | | | |
|---|---|---|---|
| 8,607,826 B2* | 12/2013 | Krohn | F16L 57/02 |
| | | | 138/110 |
| 8,869,840 B2* | 10/2014 | Lund | E21B 17/017 |
| | | | 138/110 |
| 2008/0295912 A1* | 12/2008 | Louvain-Walters | ............ |
| | | | E21B 17/012 |
| | | | 138/172 |
| 2011/0155459 A1 | 6/2011 | Nicholson et al. | |
| 2012/0304447 A1* | 12/2012 | Smith | F16L 57/02 |
| | | | 29/434 |
| 2014/0377010 A1* | 12/2014 | Van Belkom | F16L 57/02 |
| | | | 405/168.1 |
| 2015/0020910 A1* | 1/2015 | Pedersen | E21B 17/017 |
| | | | 138/106 |
| 2015/0159443 A1 | 6/2015 | Springett et al. | |

* cited by examiner

BEND LIMITING DEVICE FOR A CABLE CONNECTED TO A FLOATING MARINE INSTALLATION OR VESSEL

TECHNICAL FIELD

The present invention relates to a bend limiting device for a cable connected to a connection point of a floating marine installation or vessel.

BACKGROUND OF THE INVENTION

Wave movements in oceans and large lakes is an important source of energy that can be utilized by harvesting energy from the waves by means of wave power assemblies, also called wave energy converters, which are positioned or anchored at locations with suitable wave conditions.

A number of different types of wave energy converters for harvesting and converting wave energy into electrical energy are previously known. So-called linear generators which, by means of a rope or other connecting means, can convert vertical movements of a buoyant body caused by wave movements into a reciprocating movement of a generator coil or rotor of a linear generator anchored to the ocean or lake floor bed are one example. The reciprocating movement of the generator coil/rotor generates in its turn electrical current in the windings of an adjacent stator of the linear generator anchored to the floor bed.

Another previously known type of wave energy converter comprises a wave energy absorbing buoyant body with an energy absorption and conversion system, which may be placed on the sea floor. The buoyant body is connected to a winch by a winch wire. The winch and the winch wire connect the buoyant body to a reference body below the water surface, such as an anchor platform under the water surface, an anchor on the sea floor, or another anchoring device. As the wave forces causes the buoyant body to move in the longitudinal direction of the winch wire, the winch is forced to rotate, whereupon the rotating motion of the winch axle produced can be converted to electricity by means of an energy conversion system.

Still another type of previously known wave energy converter is instead based on relative movement between, on the one hand, a buoyant body and a thereto attached so-called acceleration tube, and, on the other hand, a working piston reciprocable in the acceleration tube, wherein the relative movement is caused by wave movements in the body of water where the wave energy converter is anchored by means of one or several mooring lines to harvest wave energy. The movement of the working piston can be used for driving for example a pump unit, such as a double-acting hydraulic pump or a hose pump, a hydraulic motor and/or a hydraulic turbine of an energy conversion system, which is disposed within or adjacent to the buoyant body to produce electricity which can be transmitted to an energy storage or electrical grid.

When harvesting electric power from wave energy, it is desirable to be able to place several wave energy converters in an array in the vicinity of each other in a location with particularly favourable wave conditions to achieve an efficient harvesting of wave energy. By arranging for example ten, twenty, or even more wave energy converters in such an array, also called a wave power station, several advantages are achieved. One advantage is that one and the same service vessel can carry out check-ups, repairs and routine maintenance on all wave energy converters in the wave power station without unnecessary transportation, which saves time, personnel and costs. Another advantage is that the electric power generated by the wave energy converters in a wave power station can be transmitted via output cables from the individual wave energy converters to a common connection substation, and via a common cable from the connection substation to shore, which decreases the transmission losses and the risk of cable failures, and reduces the cost for laying power cables.

In wave power stations where the energy conversion system for the individual wave energy converters is placed on an ocean or lake floor surface, or on a submarine structure anchored to the floor surface, which is often the case with e.g. linear generators, it is most natural to also arrange both the connection substation and the common cable leading therefrom on or at the floor surface, i.e. under the water surface. Such a positioning of electrical connection substations and common cables under the water surface, however, may lead to very high costs for underwater equipment and divers, for example when output cables from individual wave energy converters or common cables are to be connected, disconnected or replaced.

In wave power stations where instead the individual wave energy converters are of a type where the energy conversion system is placed adjacent to a buoy or buoyant body floating on or near the water surface, as is usually the case e.g. with wave energy converters with acceleration tubes, it would be possible to eliminate, or considerably reduce, the costs for divers and underwater work associated with connection, disconnection and replacement of cables, if also the connection substation/-stations is/are designed to float on or near the water surface, which is of course advantageous.

However, it had been found that such a positioning of the energy conversion system and/or the common connection substation for the wave energy converters floating at the water surface, which is advantageous per se, implies that the end portions of the cables connected to the individual wave energy converters and/or to the common connection substation will be subjected to large bending stresses caused by wave movements near the water surface, which, in the worst case, can lead to premature fatigue failure of the cables, operational breakdowns and increased costs for repairs and replacement of cables.

The bending stresses on the end portions of the cables caused by wave movements at the surface can to some extent be reduced by placing the lead-out point from or lead-in point to the wave energy converters or connection substations for the cables as far below the water surface as is practically possible, but as a rule this does not reduce the risk of fatigue failure sufficiently to achieve the operational reliability and operational economy desired for this type of marine installations.

Accordingly, in order to reach the best possible operational reliability and operational economy for different floating marine installations or vessels of this surface-based type, especially wave energy converters and their connection substations, it would be a great advantage to be able to further reduce the risk of fatigue failures of the end portions of the cables near the water surface, in a way that does not lead to undesired additional costs for divers and underwater work.

It is previously known to use external bend limiting devices for different power and signal cables, for example electrical connection cords for electrical appliances and optical fibre cables. However, a disadvantage of many of the previously known bend limiters is that they are not designed and dimensioned to be usable in the type of marine installations in question. Another disadvantage of the previously known bend limiting devices is that they usually are configured to be secured to an attachment surface of the installation by means of threads, screws or other joining means which require that a mechanic gets physical access to the joining means to be able to secure or detach such a bend limiter from its attachment surface, which leads to additional costs for divers and underwater work in applications where the attachment surface is located under water.

SUMMARY OF THE INVENTION

A first object of the present invention is therefore to provide a bend limiting device for a cable connected to a floating marine installation or vessel which reduces the risk of fatigue failure of the cable caused by wave movements at the water surface, and which does not require divers or expensive underwater work in order to secure or detach the bend limiting device and/or to replace the cable with a new cable.

This first object is achieved by means a bend limiting device for a cable connected to a connection point of a floating marine installation or vessel according to claim 1, which comprises at least one elongated sleeve member provided with an entrance end, which exhibits an entrance opening into said sleeve member for the cable connected to said connection point, an exit end, opposite to the entrance end, which exit end exhibits an exit opening for the cable out of said sleeve member, an outer abutment surface disposed between the entrance end and the exit end, which abutment surface is adapted to be secured against a rigid surface of said marine installation or vessel, an axially through-going hole between the entrance opening and the exit opening for accommodating a portion of the cable, and at least one clamping device for securing said sleeve member in a fixed position around said accommodated portion of the cable, wherein the outer abutment surface of the sleeve member is configured to allow it to be secured against said rigid surface by applying a pulling force on the cable and the sleeve member secured thereto in a direction from the abutment surface to said rigid surface of said marine installation or vessel, as well as to allow it to be detached from said rigid surface when the application of pulling force on the cable ceases.

By designing the sleeve member of the bend limiting device such that it can be tightened around the cable and secured against a rigid surface of the floating marine installation or vessel by applying a pulling force on the cable and can be detached from the rigid surface when the application of pulling force on the cable ceases, an old cable can be replaced with a new cable, with no need for divers or underwater work, by:

ceasing the application of pulling force on the old cable which is to be replaced;

attaching a pulling line to the inner end of the old cable and letting the old cable run out together with the sleeve member detached from the rigid surface and pull with it a portion of the pulling line away from the installation or vessel;

picking up the pulling line, with the attached old cable and the sleeve member, from the water outside the installation or vessel;

detaching the pulling line and the sleeve member from the old cable;

mounting the sleeve member and the pulling line on a new cable intended to replace the old cable;

then pulling the new cable into the installation or vessel by means of the pulling line; and thereafter resuming the application of pulling force on the new cable so that the surrounding sleeve member is once again secured against the rigid surface of the marine installation or vessel.

A second object of the present invention is provide a reliable way to accomplish the application of pulling force on the cable and securing of the outer abutment surface of the sleeve member against the rigid surface of the installation or vessel.

This second object is achieved by means of a bend limiting device according to claim 3, which comprises at least one pulling means, which is connected to a rigid member of said marine installation or vessel and adapted to transmit a pulling force, in a direction from said entrance opening to said rigid member, to the cable between said connection point and said entrance opening to achieve securing of the outer abutment surface of the sleeve member against the rigid surface of the marine installation or vessel.

By providing the bend limiting device with a pulling means specially adapted to the purpose, a reliable application of pulling force on the cable, and thereby reliable securing of the outer abutment surface of the sleeve member against the rigid surface of the installation or vessel, are made possible.

A third object of the present invention is to provide a bend limiting device which enables both an efficient application of pulling force and an easy replacement of an old cable with a new cable.

This third object is achieved by means of a bend limiting device according to claim 4, where the pulling means is connected to the rigid member via a tensioning device and configured such that it is secured to the cable when applying pulling force by means of the tensioning device, and such that it can be detached from the cable when there is no application of pulling force with the tensioning device.

By connecting the pulling means to the rigid member via such a tensioning device, an optional and efficient application of pulling force via the pulling means on the cable by means of the tensioning device and an optional interruption of application of pulling force on the cable by means of the tensioning device, respectively, are made possible. By furthermore designing the pulling means such that it can be detached from the cable when ceasing applying the pulling force with the tensioning device, the detached pulling means can easily be replaced with a pulling line when cable replacement becomes necessary, as described above, to then be able to let the sleeve member with the attached old cable down into the body of water surrounding the marine installation or vessel by means of the pulling line, to pick up the pulling line with the attached sleeve member and the old cable from the water, to detach the old cable from the sleeve member and the pulling line, to fasten the sleeve member and to attach the outer end of the pulling line to a new cable, and to then pull in the end of the new cable into the installation or vessel by means of the pulling line, to detach the pulling line from the new cable, and to instead attach the pulling means to the new cable, and to thereafter apply pulling force from the tensioning device via the pulling means on the new cable so that the abutment surface of the sleeve member is secured against the rigid surface of the marine installation or vessel.

A fourth object of the present invention is to provide a bend limiting device with a particularly advantageous type of pulling means.

This fourth object is achieved by means of a bend limiting device according to claim 5, in which the pulling means comprises a spiral wrap or pulling sock, which is configured such that it is tightened around the cable by the applied pulling force, and such that it can be detached manually from the cable when there is no application of pulling force.

Such a pulling means can be produced at a reasonable cost and be given a design that allows a mechanic to detach the pulling means manually from an old cable which is to be replaced and to mount the pulling means manually on a new cable pulled in, which is to be connected to the installation or vessel.

A fifth object of the present invention is to specify a particularly advantageous configuration of the bend limiting device.

This fifth object is achieved by means of a bend limiting device according to claim 11, which is configured to be secured against a rigid surface of a wave energy converter or other floating unit in a wave power plant so as to surround and protect a portion subjected to bending of an entering or exiting cable from fatigue failure.

By designing the bend limiting device so as to protect cables connected to a wave energy converters and/or other units in a wave power plant from bending fatigue and cable failures, the operational reliability can be increased and the costs for purchasing new cables and costs associated with replacement of cables be reduced, which improves the operational economy and profitability of the wave power plant considerably.

Further objects of the invention, and the features enabling these objects to be achieved, will become evident from the following description.

BRIEF DESCRIPTION OF THE DRAWINGS

In the following, the invention will be described by means of a number of different embodiments with reference to the accompanying drawings, in which.

DESCRIPTION OF EMBODIMENTS OF THE INVENTION

Figure 1:
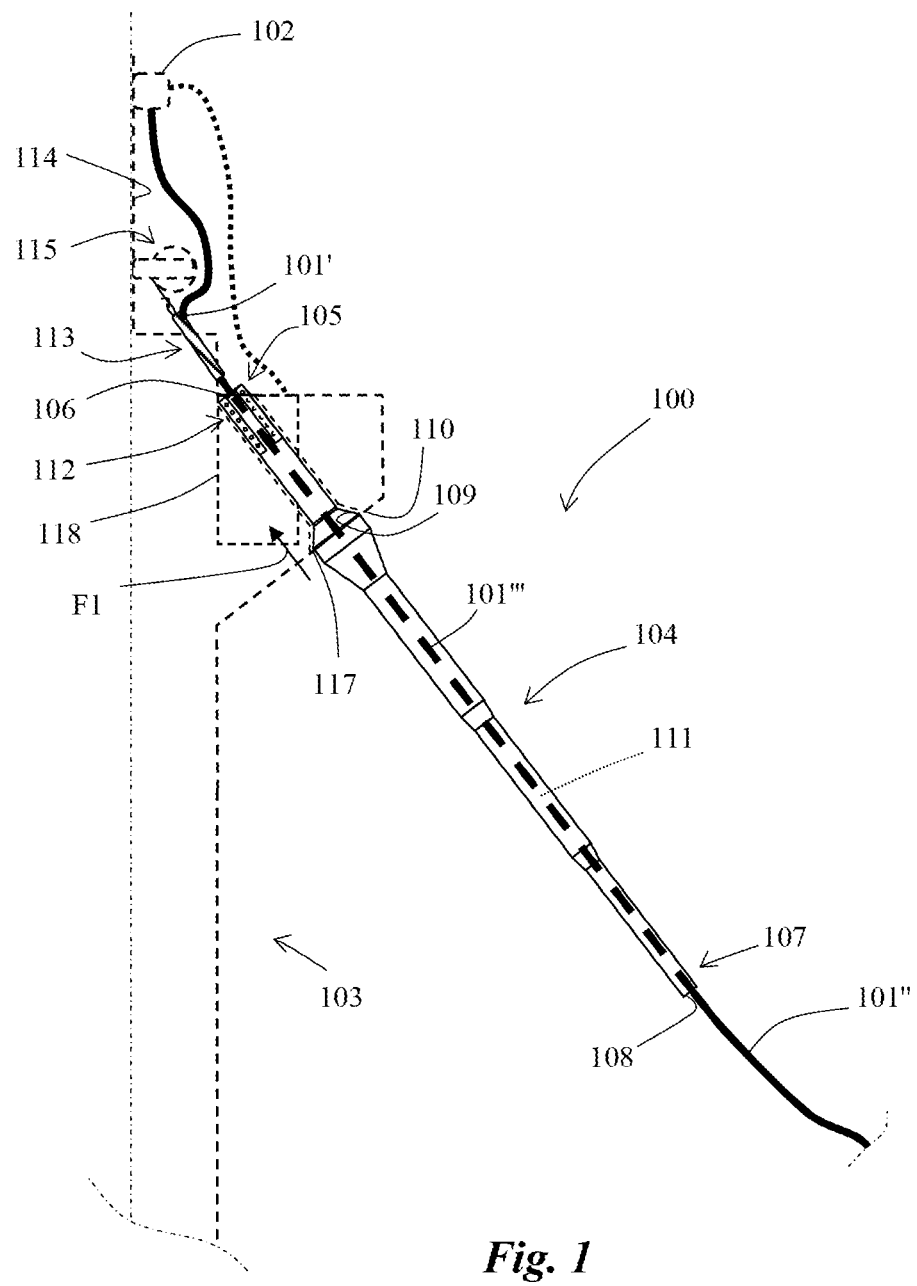
FIG. 1 schematically illustrates a bend limiting device, according to a preferred embodiment of the invention, which is disposed so as to protect a cable connected to a floating marine installation or vessel from bending stresses.
Figure 2:
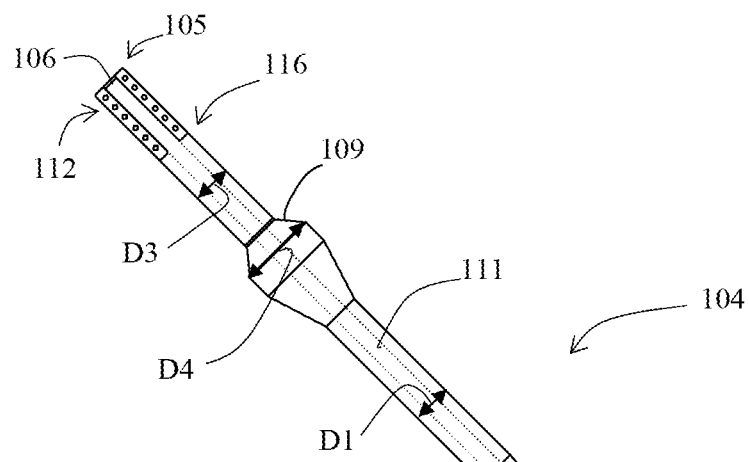
FIG. 2 is a schematic side view of a sleeve member of the bend limiting device of FIG. 1.
Figure 3:
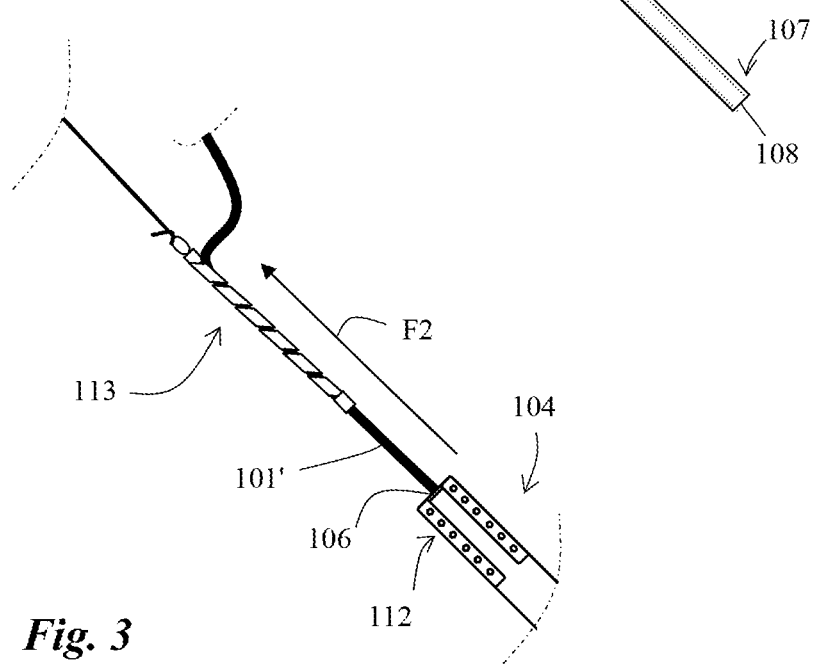
FIG. 3 is a schematic side view of a pulling means of the bend limiting device of FIG. 1, in the form of a spiral wrap, which is tightened around a portion of the cable outside the sleeve member by a pulling force applied on the cable, and which can be detached manually from the cable by a mechanic when there is no application of pulling force on the cable.
Figure 4:
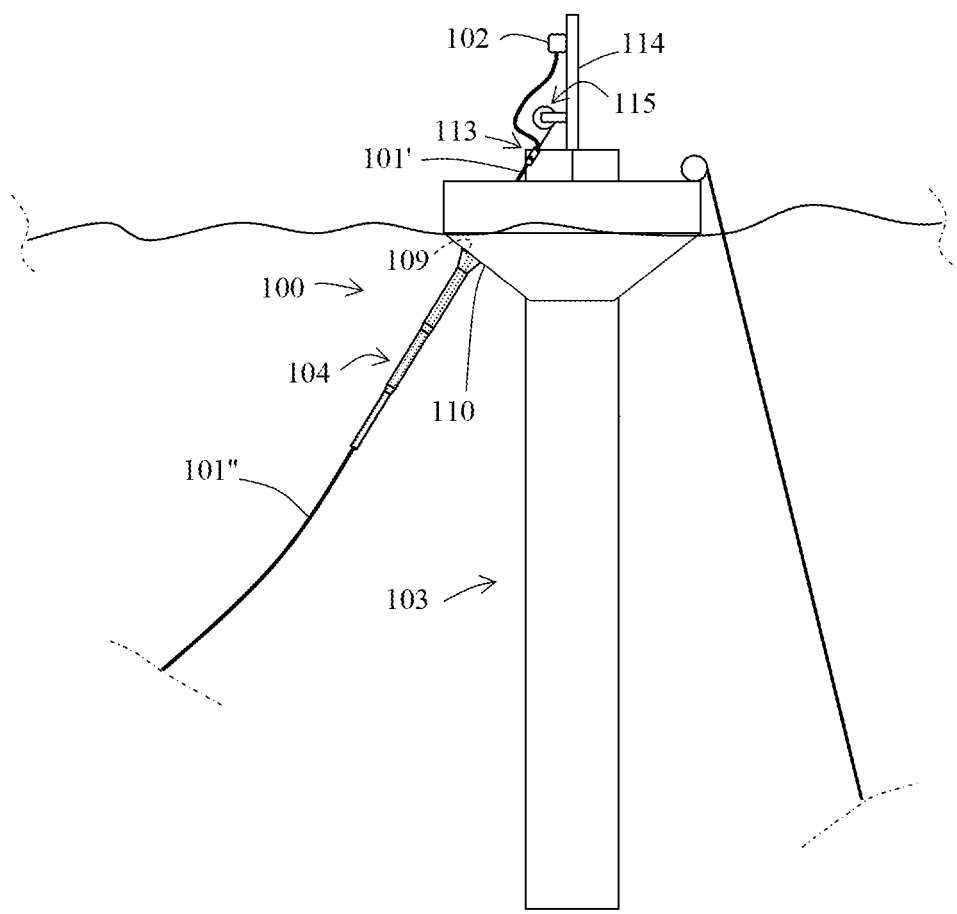
FIG. 4 schematically illustrates a bend limiting device, according to a particularly preferred embodiment of the invention, which is secured against a rigid surface of a wave energy converter in a wave power plant so as to surround and protect a portion subjected to bending of a cable exiting from the wave energy converter from fatigue failure.

In the following, a number of embodiments of a bend limiting device according to the invention will be described in greater detail with reference to the accompanying FIGS. 1-4.

The bend limiting device 100 according to the invention is intended to be used for protecting a cable 101' connected to a connection point 102 of a floating marine installation 103 or vessel. The expression "floating marine installation or vessel" as used herein is intended to include any installation or vessel floating in water where entering or exiting power and/or signal cables need to be protected from bending stresses caused by wave movements at the water surface.

As is evident from the figures, the bend limiting device 100 according to the invention comprises at least one elongated sleeve member 104 provided with an entrance end 105, which exhibits an entrance opening 106 into the sleeve member 104 for the cable 101' connected to said connection point 102, and an exit end 107, opposite to the entrance end, which exit end exhibits an exit opening 108 for the cable 101" out of the sleeve member 104.

The sleeve member 104 is further provided with an outer abutment surface 109 disposed between the entrance end 105 and the exit end 107, which abutment surface is adapted to be secured against a rigid surface 110 of the marine installation 103 (see FIG. 1) or vessel, an axially through-going hole 111 between the entrance opening 106 and the exit opening 108 for accommodating a portion 101''' of the cable, and at least one clamping device 112 for securing the sleeve member 104 in a fixed position around the portion 101''' of the cable accommodated in the sleeve member.

In the bend limiting device 100 according to the invention, the outer abutment surface 109 of the sleeve member 104 is configured to allow it to be secured against the rigid surface 110 of the installation or vessel by applying a pulling force F1 (see FIG. 1) on the cable 101' and the sleeve member 104 secured thereto in a direction from the abutment surface 109 to the rigid surface 110, as well as to allow it to be detached from the rigid surface 110 when the application of pulling force on the cable ceases. By designing the outer abutment surface 109 of the sleeve member 104 such that it can be secured against the rigid surface 110 by applying a pulling force F1 on the cable and can be detached from the rigid surface 110 when the application of pulling force ceases, it becomes possible to replace an old cable with a new one with no need for divers or underwater work.

In order to ensure a problem-free detachment of the outer abutment surface 109 of the sleeve member 104 from the rigid surface 110, the abutment surface 109 exhibits an externally convex or conical shape intended to interact with an internally concave or conical shape of the rigid surface 110 of the marine installation 103 or vessel in a particularly advantageous embodiment. However, within the scope of the invention, it is also possible with embodiments where the outer abutment surface has another suitable shape which allows a problem-free detachment from the interacting rigid surface of the marine installation or vessel in the application in question.

In a preferred embodiment of the invention, the bend limiting device 100 comprises at least one pulling means 113, which is connected to a rigid member 114 of the marine installation 103 or vessel and adapted to transmit a pulling force F2 (see FIG. 3), in a direction from the entrance opening 106 of the sleeve member to the rigid member 114, to the cable 101' between the connection point 102 for the cable (see FIG. 1) and the entrance opening 106 of the sleeve member to achieve securing of the outer abutment surface 109 of the sleeve member 104 against the rigid surface 110 of the marine installation 103 or vessel. Thanks to the provision of such a pulling means 113 specially adapted to the purpose, a reliable application of pulling force, and thereby reliable securing of the outer abutment surface of the sleeve member against the rigid surface of the installation or vessel, are made possible.

In a particularly preferred embodiment of the invention, the pulling means 113 of the bend limiting device 100 is connected to the rigid member 114 via a tensioning device 115 (see FIGS. 1 and 4) and configured such that it is secured to the cable 101' when applying pulling force by means of the tensioning device 115, and such that it can be detached from the cable when there is no application of pulling force with the tensioning device. Thanks to the provision of a suitable tensioning device, advantageously a hand-operated or motorized winch 115 or reeling drum, between the pulling means and the rigid member of the marine installation or vessel, an optional and efficient application of pulling force via the pulling means on the cable by means of the tensioning device, and an optional interruption of application of pulling force on the cable by means of the tensioning device, respectively, are made possible. Thanks to the fact that the pulling means 113 is designed such that it can be detached from the cable when ceasing applying the pulling force with the tensioning device, the detached pulling means can easily be replaced with a pulling line as described previously, to enable a replacement of the cable with a new one without any need for divers or underwater work.

In a particularly preferred embodiment of the invention, the pulling means 113 of the bend limiting device 100 comprises a spiral wrap 113 (see FIG. 3) or pulling sock, preferably of a wire, mesh or ribbon shaped textile or polymer material, which advantageously can be provided with a fastening means for attaching a pulling line or wire of a tensioning device, and which is configured such that it is tightened around the cable 101' by the applied pulling force F2, and such that it can be detached manually from the cable when there is no application of pulling force. Such a pulling means can be provided at a reasonable cost and be given a design that allows a mechanic to detach the pulling means manually from an old cable which is to be replaced in an easy and quick manner, and to mount the pulling means manually on a new cable pulled in, which is to be connected to the connection point onboard the installation or vessel.

The sleeve member 104 (see FIG. 2) of the bend limiting device 100 according to the invention advantageously, but not necessarily, has a circularly cylindrical cross-section and preferably exhibits an outer diameter D1 narrowing continuously and/or gradually from the outer abutment surface 109 to the exit end 107. The axially through-going hole 111 in the sleeve member 104 can, but does not necessarily have to, exhibit a substantially constant diameter D2 from the entrance opening 106 to the exit opening 108.

In a particularly advantageous embodiment, the sleeve member 104 (see FIG. 1) of the bend limiting device exhibits a first bending rigidity in the vicinity of the outer abutment surface 109 and a second bending rigidity at the exit end 107, wherein the first bending rigidity of the sleeve member 104 is at least 10 times larger than the bending rigidity of the cable 101" exiting from the sleeve member 104 and the second bending rigidity of the sleeve member is no more than 3 times larger than the bending rigidity of the cable 101" exiting from the sleeve member 104. Such a matching of the bending rigidity of the sleeve member 104 prevents the cable portion 101''' inside the sleeve member and also the cable portions 101', 101" immediately outside the sleeve member from being subjected to excessive bending stresses and suffering premature fatigue failures.

In one advantageous embodiment of the bend limiting device 100 according to the invention, the sleeve member 104 (see FIG. 2) forms an insertion portion 116 between the entrance end 105 and the abutment surface 109, wherein the insertion portion 116 has a smaller outer diameter D3 than the largest outer diameter D4 of the abutment surface 109 and is configured for insertion into an opening 117 (see FIG. 1) in the rigid surface 110 of the marine installation 103 or vessel. The length and diameter of such an insertion portion 116 can easily be adapted to the actual dimensions and configuration of the type of installation or vessel for which the bend limiting device is to be usable. The insertion portion 116 can also be configured to form part of, or constitute, a leak-proof cable lead-through for the cable into the marine installation or vessel. The insertion portion can also be provided with a longitudinal passage or slit (not shown) for drainage of undesired water from a compartment 118 (indicated in FIG. 1) that has to be kept dry in the marine installation 103 or vessel.

Preferably, the sleeve member 104 of the bend limiting device 100 mainly consists of a polymer or rubber material, advantageously polyurethane. The at least one clamping device 112 of the sleeve member 104 preferably comprises one or several metal components protected against corrosion, for example a pair of clamping members or clamping plates of metal with fastening screws. However, within the scope of the present invention, it is also conceivable with other embodiments where the sleeve member comprises other suitable materials and components.

In a particularly preferred embodiment of the invention, the bend limiting device 100 (see FIG. 4)) is configured to be secured against a rigid surface 110 of a wave energy converter 103 or other floating unit in a wave power plant so as to surround and protect a portion subjected to bending of an entering or exiting cable from fatigue failure. In such an application, the operational reliability can be increased and the costs for purchasing new cables and costs associated with replacement of cables be reduced, which improves the operational economy and profitability of the wave power plant considerably.

In the foregoing, the present invention has been described with the aid of a number of different embodiments and with reference to the accompanying drawings. It should be understood, however, that the invention is not limited to the described embodiments and to what is shown in drawings, but that also other embodiments are conceivable within the scope of the invention as it is defined by the following claims.

The invention claimed is:

1. A bend limiting device (100) for a cable (101') connected to a connection point (102) of a floating marine installation (103) or vessel, said bend limiting device comprising at least one elongated sleeve member (104) provided with:

an entrance end (105), which exhibits an entrance opening (106) into said sleeve member (104) for the cable (101') connected to said connection point (102);

an exit end (107), opposite to the entrance end, which exit end exhibits an exit opening (108) for the cable (101") out of said sleeve member (104);

an outer abutment surface (109) disposed between the entrance end (105) and the exit end (107), which abutment surface is adapted to be secured against a rigid surface (110) of said marine installation (103) or vessel;

an axially through-going hole (111) between the entrance opening (106) and the exit opening (108) for accommodating a portion (101''') of the cable; and at least one clamping device (112) for securing said sleeve member (104) in a fixed position around said accommodated portion (101''') of the cable, wherein the outer abutment surface (109) of the sleeve member (104) is configured to allow it to be secured against said rigid surface (110) by applying a pulling force (F1) on the cable (101') and the sleeve member (104) secured thereto in a direction from the abutment surface (109) to said rigid surface (110) of said marine installation (103) or vessel, as well as to allow it to be detached from said rigid surface (110) when the application of pulling force on the cable ceases.

2. The bend limiting device (100) according to claim 1, wherein the outer abutment surface (109) of the sleeve member (104) exhibits an externally convex or conical shape intended to interact with an internally concave or conical shape of the rigid surface (110) of said marine installation (103) or vessel.

3. The bend limiting device (100) according to claim 1, wherein the bend limiting device (100) comprises at least one pulling means (113), which is connected to a rigid member (114) of said marine installation (103) or vessel and adapted to transmit a pulling force (F2), in a direction from said entrance opening (106) to said rigid member (114), to the cable (101') between said connection point (102) and said entrance opening (106) to achieve securing of the outer abutment surface (109) of the sleeve member (104) against the rigid surface (110) of said marine installation (103) or vessel.

4. The bend limiting device (100) according to claim 1, wherein a pulling means (113) is connected to the rigid member (114) via a tensioning device (115) and configured such that it is secured to the cable (101') when applying pulling force by means of the tensioning device (115) and such that it can be detached from the cable when there is no application of pulling force with the tensioning device.

5. The bend limiting device (100) according to claim 1, wherein a pulling means comprises a spiral wrap (113) or pulling sock, which is configured such that it is tightened around the cable (101') by the applied pulling force (F2) and such that it can be detached manually from the cable when there is no application of pulling force.

6. The bend limiting device (100) according to claim 1, wherein the sleeve member (104) exhibits an outer diameter (D1) narrowing continuously and/or gradually from the outer abutment surface (109) to the exit end (107).

7. The bend limiting device (100) according to claim 1, wherein the sleeve member (104) exhibits a first bending rigidity in the vicinity of the outer abutment surface (109) and a second bending rigidity at the exit end (107), wherein the first bending rigidity of the sleeve member (104) is at least 10 times larger than the bending rigidity of the cable (101") exiting from the sleeve member (104) and the second bending rigidity of the sleeve member is no more than 3 times larger than the bending rigidity of the cable (101") exiting from the sleeve member (104).

8. The bend limiting device (100) according to claim 1, wherein the sleeve member (104) forms an insertion portion (116) between the entrance end (105) and the abutment surface (109), wherein the insertion portion (116) has a smaller outer diameter (D3) than the largest outer diameter (D4) of the abutment surface (109) and is configured for insertion into an opening (117) in the rigid surface (110) of said marine installation (103) or vessel.

9. The bend limiting device (100) according to claim 1, wherein the sleeve member (104) mainly consists of a polymer or rubber material.

10. The bend limiting device (100) according to any claim 1, wherein the at least one clamping device (112) of the sleeve member (104) comprises one or several metal components protected against corrosion.

11. The bend limiting device (100) according to claim 1, wherein the bend limiting device (100) is configured to be secured against a rigid surface (110) of a wave energy converter (103) or other floating unit in a wave power plant so as to surround and protect a portion subjected to bending of an entering or exiting cable from fatigue failure.

12. The bend limiting device (100) according to claim 2, wherein the bend limiting device (100) comprises at least one pulling means (113), which is connected to a rigid member (114) of said marine installation (103) or vessel and adapted to transmit a pulling force (F2), in a direction from said entrance opening (106) to said rigid member (114), to the cable (101') between said connection point (102) and said entrance opening (106) to achieve securing of the outer abutment surface (109) of the sleeve member (104) against the rigid surface (110) of said marine installation (103) or vessel.

13. The bend limiting device (100) according to claim 2, wherein a pulling means (113) is connected to a rigid member (114) via a tensioning device (115) and configured such that it is secured to the cable (101') when applying pulling force by means of the tensioning device (115) and such that it can be detached from the cable when there is no application of pulling force with the tensioning device.

14. The bend limiting device (100) according to claim 3, wherein the pulling means (113) is connected to the rigid member (114) via a tensioning device (115) and configured such that it is secured to the cable (101') when applying pulling force by means of the tensioning device (115) and such that it can be detached from the cable when there is no application of pulling force with the tensioning device.

15. The bend limiting device (100) according to claim 2, wherein a pulling means comprises a spiral wrap (113) or pulling sock, which is configured such that it is tightened around the cable (101') by the applied pulling force (F2) and such that it can be detached manually from the cable when there is no application of pulling force.

16. The bend limiting device (100) according to claim 3, wherein the pulling means comprises a spiral wrap (113) or pulling sock, which is configured such that it is tightened around the cable (101') by the applied pulling force (F2) and such that it can be detached manually from the cable when there is no application of pulling force.

17. The bend limiting device (100) according to claim 4, wherein the pulling means comprises a spiral wrap (113) or pulling sock, which is configured such that it is tightened around the cable (101') by the applied pulling force (F2) and such that it can be detached manually from the cable when there is no application of pulling force.

18. The bend limiting device (100) according to claim 2, wherein the sleeve member (104) exhibits an outer diameter (D1) narrowing continuously and/or gradually from the outer abutment surface (109) to the exit end (107).

19. The bend limiting device (100) according to claim 3, wherein the sleeve member (104) exhibits an outer diameter (D1) narrowing continuously and/or gradually from the outer abutment surface (109) to the exit end (107).

20. The bend limiting device (100) according to claim 4, wherein the sleeve member (104) exhibits an outer diameter (D1) narrowing continuously and/or gradually from the outer abutment surface (109) to the exit end (107).

* * * * *